United States Patent Office 2,749,955
Patented June 12, 1956

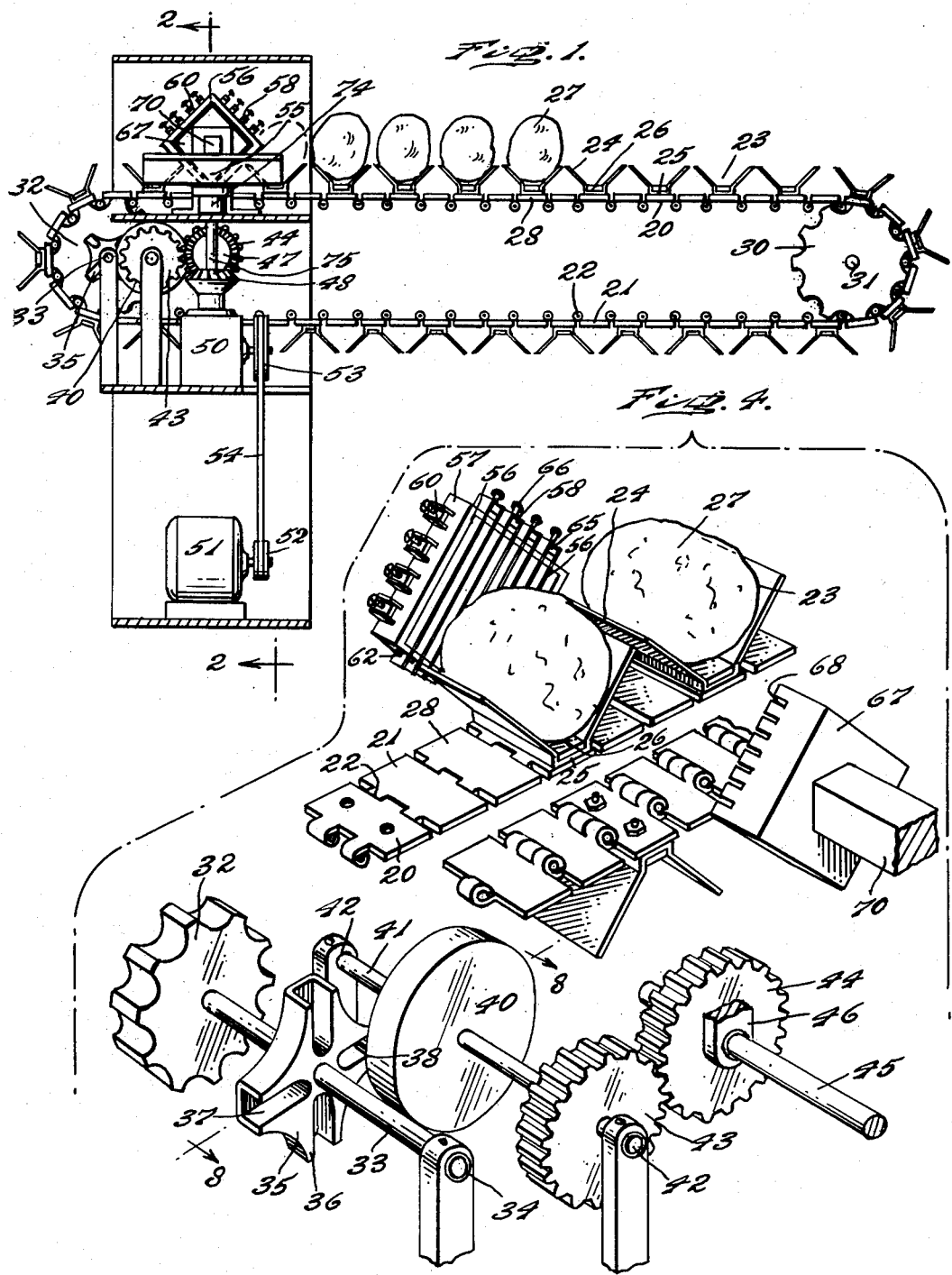

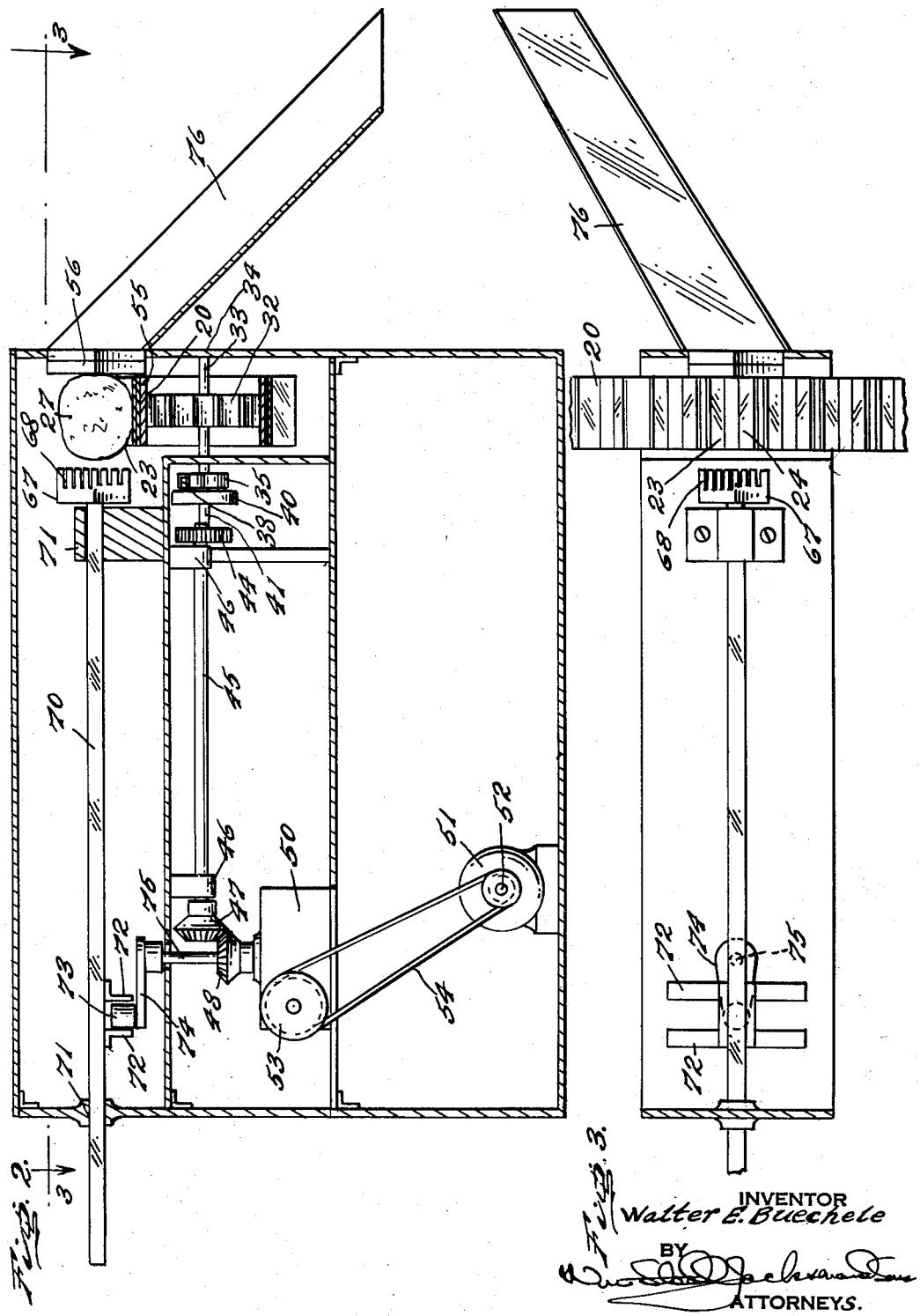

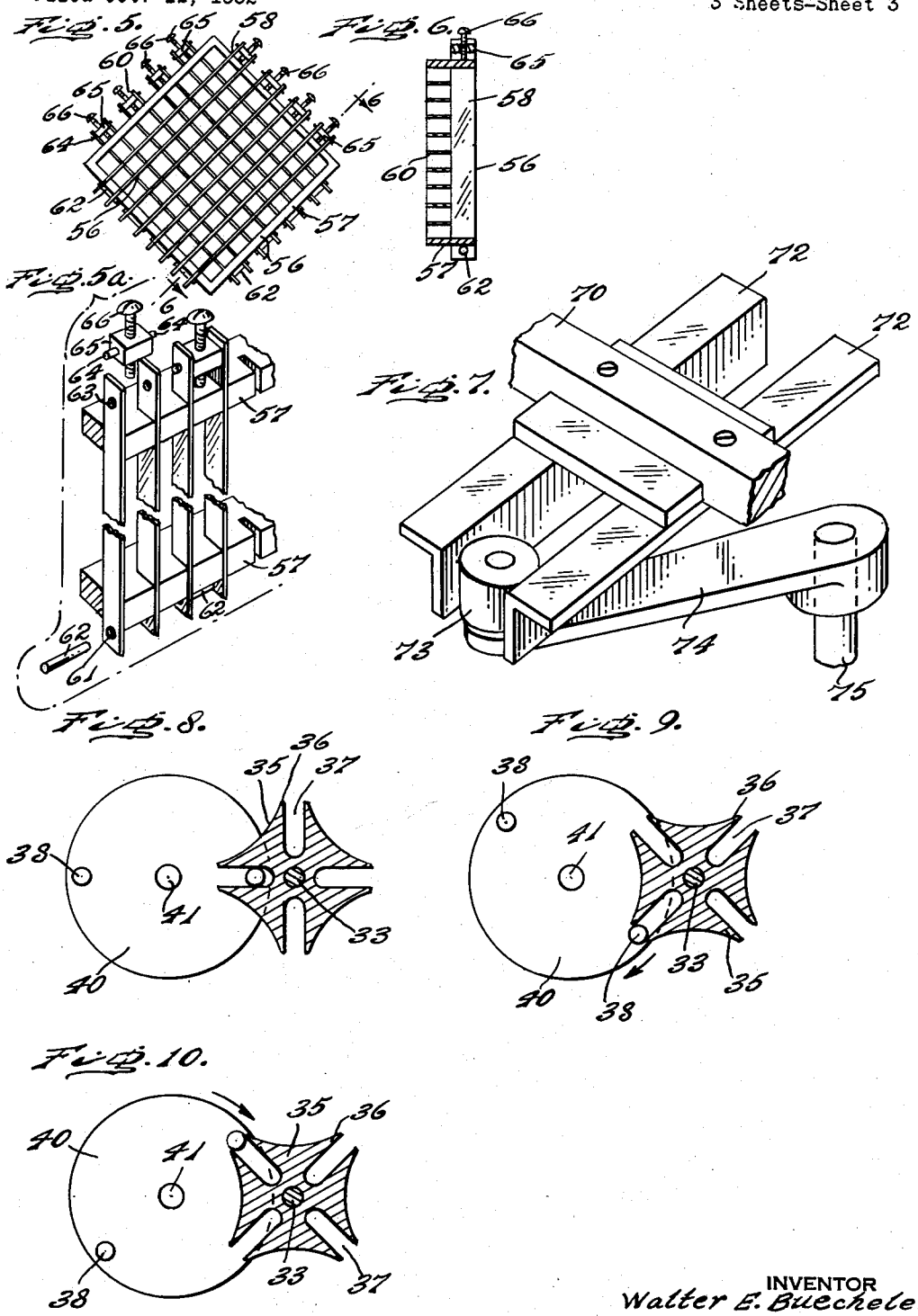

2,749,955

POTATO DICING MACHINE

Walter E. Buechele, Upper Darby, Pa., assignor to Brock & Company, Inc., a corporation of Pennsylvania Application October 11, 1952, Serial No. 314,279

3 Claims. (Cl. 146—169)

The present invention relates to a potato dicing machine, which is also applicable to dicing other types of vegetables, such as carrots, turnips, and the like.

A purpose of the invention is to obtain relatively long diced pieces of potato by automatic dicing.

A further purpose is to reduce the tendency of mechanically diced potatoes to crack at the corners and break up.

A further purpose is to reduce the tendency of mechanically diced potatoes to take up and become soaked with grease in French frying, and thus to obtain more crisp and edible French fried potatoes.

A further purpose is to progress potatoes on a conveyor which is provided with pockets which automatically locate the potato with its long axis transversely of the conveyor so that it can be pushed laterally through a dicer to obtain long diced pieces of potato.

A further purpose is to provide the conveyor with upwardly directed pockets which have downwardly converging transversely extending sides desirably at angles about 45° to the vertical, the pockets being narrower at the top and bottom than the average length of the potatoes and wider at the top but narrower at the bottom than the average width of the potatoes, and the pockets being open at both sides.

A further purpose is to advance the conveyor containing the potatoes intermittently until a particular pocket is brought into registry with a dicing station, and then to force the potato off the conveyor and through a dicer by a pusher which moves across the pocket and penetrates into the space between the knives of the dicer.

A further purpose is to position both sets of knives diagonally and parallel to the respective sides of the pockets.

A further purpose is to place one set of parallel spaced knives ahead of another so as to avoid confining all sides of the potato piece during dicing, thus avoiding crushing which will tend to crack the corners.

A further purpose is to make the dicing knives in pairs, to anchor one end of each knife in one end of a frame and to tension the knives by adjusting tensioning heads which are positioned between the knives beyond the frame at the other end.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a diagrammatic front elevation of the machine of the invention, the housing being broken away to show the interior.

Figure 2 is an offset section on the line 2—2 of Figure 1.

Figure 3 is a plan section on the line 3—3 of Figure 2.

Figure 4 is an enlarged fragmentary diagrammatic perspective showing the operation at the dicing position.

Figure 5 is an enlarged front elevation of the dicing knives.

Figure 5a is a further enlarged fragmentary exploded perspective of Figure 5.

Figure 6 is a section on the line 6—6 of Figure 5.

Figure 7 is a fragmentary enlarged perspective showing the crank operation of the pusher.

Figures 8, 9 and 10 are fragmentary diagrammatic sections on the line 8—8 of Figure 4, showing the Geneva motion in different positions.

In connection with the commercial production of French fried potatoes, and especially of frozen French fried potatoes, it is very desirable to be able to produce a satisfactory diced piece which will meet all requirements.

Prior art dicing machines applicable to potatoes have involved a number of difficulties. In such prior art machines, the potato, unless placed by hand, has had a tendency to go into the dicer sideways, thus producing objectionably short diced pieces. By the device of the present invention, potatoes are automatically aligned so that they will go into the dicing knives in the direction of the major axis.

Many of the prior art dicers have forced the potato through a space closed on all four sides at the same longitudinal position due to overlapping of the placement of the cutting knives, thus tending to crush the diced piece of potato, and in many cases causing cracks at the corners. Such corner cracks are particularly objectionable because they permit the potato to take up grease in the deep fat frying operation, and it does not come out crisp and tasty. Furthermore in some instances the diced piece has been broken or cracked so badly that it readily breaks during subsequent operations. By the present invention the potato is first cut by one set of parallel knives and then by another set of parallel knives positioned farther along longitudinally but it is never confined on all four sides of the piece at the same position. Accordingly there is no tendency to cause cracking at the corners of the diced piece, and no tendency to soak up grease, so that the finished French fried potato is more crisp.

In the device of the invention the sides of the potatoes are disposed diagonally to the vertical and the sides of the pusher, and also the directions of the two sets of knives conform to this diagonal arrangement, so that there is no danger of interference between the pusher and the pocket or the pusher and the knives.

The knives themselves are very well constructed for adjustment, since each knife is anchored beyond the frame at one end, and extends beyond the frame at the positioned end where it is engaged by an adjustment head positioned between the knives of each pair.

A conveyor 20 suitably consisting of hinged links 21 pivoted together at 22 mounts at equally spaced intervals along its length pockets 23 adapted to receive potatoes to be diced. Each pocket consists of opposed laterally extending downwardly converging side walls 24 which are conveniently made from a single bent metallic strip having a base portion 25 and held in place on one of the hinged elements of the conveyor by a fastening strip 26 which is suitably bolted to the conveyor.

The downwardly converging side walls 24 are suitably spaced at the top and bottom of the pocket less than the average length of the potatoes, while the spacing at the top is wider than the average width of the potatoes, and that at the bottom is narrower than the average width. Thus it is impossible for one of the potatoes 27 to socket firmly in the pocket when its major axis is parallel to the length of the conveyor, but where by the vibration, due to the intermittent starting and stopping of the conveyor, the potato reaches an angular relationship in which the major axis is transverse to the conveyor, the potato settles into the pocket and rests in stable position.

The conveyor has a forwardly moving substantially horizontal flight 28 which passes from an idling sprocket 30 which is pivotally supported on shaft 31 to a driving sprocket 32 at the opposite end, which driving sprocket is mounted on and turns with shaft 33 which is rotatably supported in bearings 34.

Also mounted on the shaft 33 is Geneva star wheel 35 having suitably four wings 36 provided with the usual Geneva wing slots 37 which are intermittently engaged by suitably diametrically opposite pins 38 (which at intervals leave slots 37) of a pin wheel 40 which is mounted on and turns with a shaft 41 rotatably supported in bearings 42. The shaft 41 also carries a gear 43 which intergears with a gear 44 mounted on a shaft 45 which is rotatably supported in bearings 46. The shaft 45 at the end remote from the gear 44 carries beveled gear 47 which intergears with beveled gear 48 on speed reducer 50 driven by motor 51 through pulleys 52 and 53 and belt 54.

At dicing position 55 a dicing knife assembly 56 is positioned at one side of the conveyor with the knives lined up transversely to the conveyor. It will be observed that there are no ends on the pockets so that a potato can be pushed out laterally into the dicer by a pusher entering at one end of the pocket and passing through the other end.

The knife assembly 56 consists of a suitably rectangular open interior frame 57 which mounts a forward set of knives 58 and a rearward set of knives 60. The knives 58 and 60 are not internesting, the knives of the set 58 extending clear across without interruption and then the knives of the set 60 located beyond the knives of the set 58 extending clear across without interruption, so that the potato is not subjected to the knives of the set 60 until it has passed completely through the knife of the set 58.

The knives of the sets 58 and 60 are arranged at right angles to one another and the knives of each set are substantially equally spaced in parallel relationship. To conform with the diagonal position of the sides 24 of the pockets (which are preferably disposed at approximately 45° to the vertical) the sides of the frame 57 are disposed diagonally or at an angle preferably of about 45° to the vertical and the knives of each set are similarly disposed diagonally or at an angle of about 45° to the vertical.

The knives are in each case composed of heavy steel blades suitably sharpened on the edge facing the potato as desired. Each of the knives extends through slots in the frame and at one end beyond the frame as at opening 61 which receives a pin 62 extending through a pair of knives and anchoring them against tension. The opposite ends of the knives have openings 63 which receive pins 64 which extend out at opposite sides from an adjustment head 65 between each pair of knives. The adjustment head is threaded longitudinally of the knives and receives an adjustment screw 66 which bears on the outside of the frame and tensions each pair of the knives.

In line with the dicing position 55, and in line with the pocket so that it can pass directly through the pocket, a pusher 67 is placed which is desirably rectangular and diagonally disposed with its sides at approximately 45 to the vertical so that the pusher can pass clear across the pocket at the dicing position. The pusher has two sets of parallel slots 68 which extend in line with the knives of the two sets, and are deep enough to receive the knives at least partially, so that when the pusher is advanced forward it will pass into the spaces between the knives as far as desired and eject any potato pieces which are in the spaces between the knives directly or by pushing on the next potato piece. The pusher is mounted on a plunger 70 which reciprocates in sliding bearings 71 and at a position remote from the pusher carries transverse spaced bars 72 which make pivotal connection with roller 73 on crank 74 which is mounted on shaft 75 from the speed reducer 50.

The pieces of diced potato beyond the knives drop through a chute 76 into any suitable receptacle.

In operation the suitably peeled potatoes are placed in the pockets beginning toward the right in Figure 1, replacement being by hand or by machine as desired. The quick stops and starts of the conveyor tend to orient the potatoes in the pockets by a jolting action. Operators along the side of the conveyor can inspect the potatoes for eyes or other defects which require removal, and any potato thus requiring further preparation can be removed from its pocket and later placed in another pocket.

When a potato is carried to the dicing position, the Geneva motion brings the pocket at the dicing position into line with the knives and the pusher and stops the conveyor at that position. While the conveyor is stopped the throw of the crank 74 causes the pusher to advance, engaging the potato and moving transversely across the pocket. The potato is forced between the knives of the set 58, separating it into slices, but leaving the sliced material free to move longitudinally of the knives. The potato is then forced between the knives of the set 60 which are located wholly beyond the knives of the set 58 and the potato is then severed into diced pieces. It is important to note that during all this action the potato is at no time gripped by the knives on all four sides at one point, so that the potato has freedom for elastic deformation and there is not a tendency to break the diced pieces or to crack the corners, which would cause soaking up of grease, lack of crispness, and poor taste in the final french fried potatoes which are produced.

The pusher continues until the pusher slots receive the knives at least partially and the pusher forces the diced potato pieces out beyond the knives into the chute 76. The pusher then undergoes retraction by the crank action, after which the Geneva motion advances the conveyor for the distance of one pocket spacing.

If the knives become loose, they can readily be tightened by tightening the tightening screws 66. If the knives require replacement or sharpening, they readily can be removed by loosening the pins engaging them at the ends and loosening the tightening screws and replacing with other knives or with the same knives after sharpening.

Thus by the invention it is possible to obtain automatic dicing of potatoes and the like, with assurance that the individual diced piece will be of the greatest length possible from the particular potato and will be free from defects which would interfere with the quality of the french fried potatoes or the frozen french fried potatoes which are produced.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a potato dicing machine, a generally horizontal conveyor having upwardly directed pockets with downwardly converging transversely extending sides narrower at the top and bottom than the average length of the potatoes and wider at the top but narrower at the bottom than the average width of the potatoes and open at the ends, means for intermittently advancing the conveyor to bring the successive pockets into line at a dicing position, a knife assembly in line at one side of the conveyor at the dicing position, a pusher in line normally located at the other side of the conveyor at the dicing position, the pusher having a range of movement from the side of the conveyor across the pocket in registry with the dicing position and into the knives, there being slots in the pusher which receive the knives, and means for pushing the pusher across the pocket which is at the dicing position and into the knives for forcing potatoes through the knives and for retracting the pusher to the side of the conveyor remote from the knives.

2. In a potato dicer, a generally horizontal conveyor having upwardly directed pockets with downwardly converging transversely extending sides narrower at the top and bottom than the average length of the potatoes and wider at the top but narrower at the bottom than the average width of the potatoes and open at the opposite ends, means for intermittently advancing the conveyor to bring successive pockets into registry with a dicing position, a knife assembly having two sets of parallel knives each directed in a diagonal direction to the vertical and generally transverse to one another, a pusher normally at one side of the conveyor remote from the knife assembly having sides which are diagonal to the vertical and having slots in line with the respective knives so that the pusher can extend among the knives, the pusher having a range of movement from its retracted position on the side of the conveyor remote from the knives through the pocket in registry at the dicing position and among the knives, and means for pushing the pusher across the pocket and forcing the potato through the knives and for retracting the pusher.

3. In a potato dicer, a generally horizontal conveyor having upwardly directed pockets with downwardly converging transversely extending sides at angles approximating 45° to the vertical, the pockets being narrower at the top and bottom than the average length of the potatoes and wider at the top but narrower at the bottom than the average width of the potatoes and the pockets being open at both ends, means for intermittently advancing the conveyor to bring successive pockets into registry at a dicing position, a first set of relatively spaced generally parallel knives positioned at one side of the conveyor in line with the dicing position and located relatively near to the conveyor, disposed at an angle of 45° to the vertical, a second set of relatively spaced generally parallel knives immediately behind the first set on the side remote from the conveyor, directed at an angle of 45° to the vertical and at substantially a right angle to the knives of the first set, a pusher normally located on the side of the conveyor remote from the knives in registry at the dicing position and having sides disposed at an angle of 45° to the vertical, having a range of movement across the pocket in registry at the dicing position and having slots in line with the respective knives so that the pusher can penetrate among the knives, and means for moving the pusher across the pocket in registry at the dicing position and forcing a potato in such pocket through the knives and for retracting the pusher.

References Cited in the file of this patent

UNITED STATES PATENTS

| | | |
|---|---|---|
| 1,431,310 | Knaus | Oct. 10, 1922 |
| 2,029,344 | Sheldon | Feb. 4, 1936 |
| 2,120,375 | Shaver et al. | June 14, 1938 |
| 2,283,029 | Bakewell | May 12, 1942 |
| 2,423,399 | Myers | July 1, 1947 |
| 2,487,431 | Floyd | Nov. 8, 1949 |
| 2,581,501 | Shaver | Jan. 8, 1952 |
| 2,628,621 | Murdoch | Feb. 17, 1953 |